UNITED STATES PATENT OFFICE.

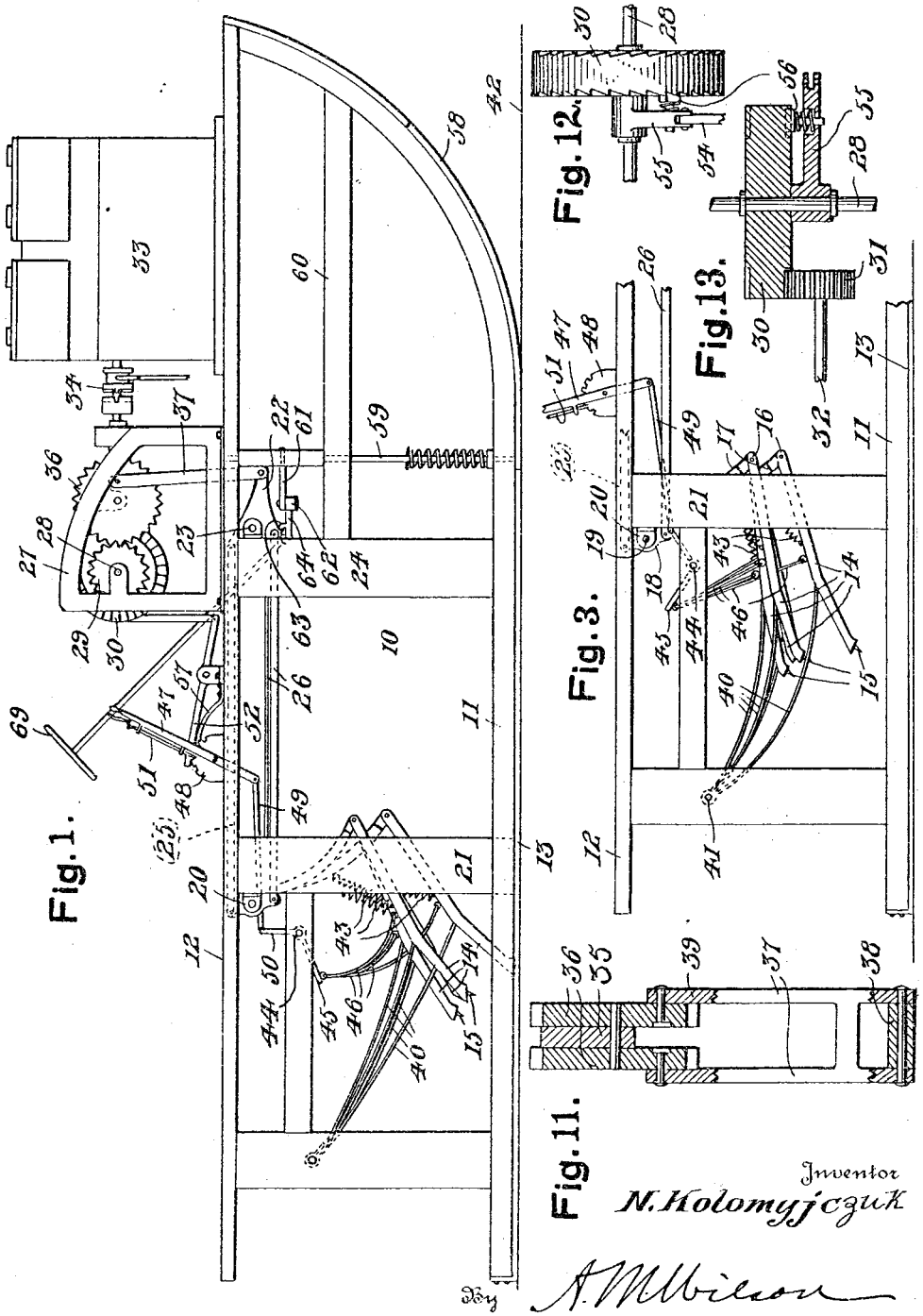

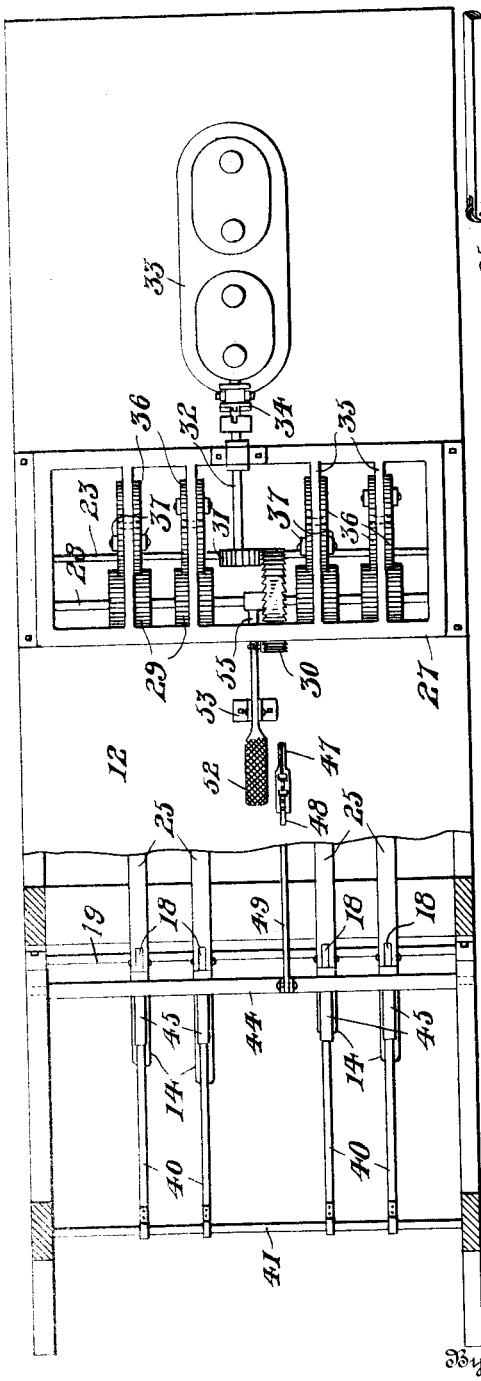

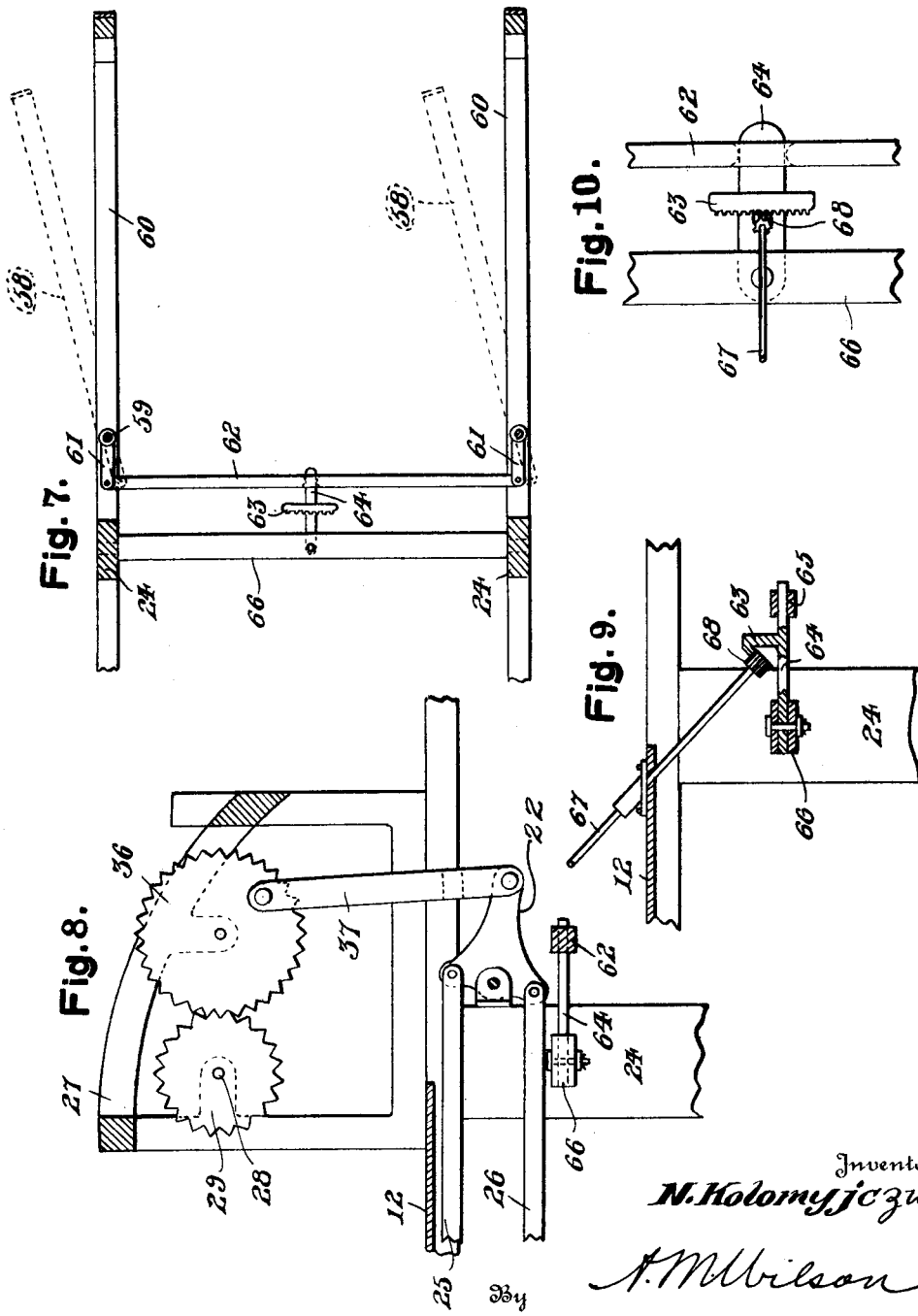

NYKOLA KOLOMYJCZUK, OF IROQUOIS FALLS, ONTARIO, CANADA.

MOTOR-SLED.

1,193,026.  Specification of Letters Patent.  Patented Aug. 1, 1916.

Application filed February 21, 1916. Serial No. 79,629.

*To all whom it may concern:*

Be it known that I, NYKOLA KOLOMYJCZUK, a subject of the Emperor of Austria-Hungary, residing at Iroquois Falls, in the Province of Ontario and Dominion of Canada, have invented certain new and useful Improvements in Motor-Sleds, of which the following is a specification.

This invention relates to new and useful improvements in motor sleds.

The primary object of the invention is the provision of a sled adapted to be motor driven and having a plurality of successively operating pushers for positively propelling the sled forwardly, an efficient steering means being arranged for the device.

A further object of the invention is the provision of a sled having motor and gear means arranged above the platform of the sled for operatively actuating positive ground engaging propellers.

The invention resides in gear means propelled either manually or by a motor and arranged upon a sled operatively connected to a series of ground engaging propelling means or pushers, the latter being simultaneously elevated when not in use and an auxiliary runner steering device being also included.

With these general objects in view and others that will appear as the nature of the invention is better understood, the same consists in the novel combination and arrangement of parts hereinafter fully described, illustrated in the accompanying drawings and then claimed.

In the drawings forming a part of this application and in which like designating characters refer to corresponding parts throughout the several views: Figure 1 is a side elevation of the device. Fig. 2 is a top plan view thereof partially broken away. Fig. 3 is a side elevation of the rear portion of the device with the propellers elevated. Fig. 4 is an enlarged perspective detail view of one of the propellers and its operative connections. Fig. 5 is an enlarged detail view partially in section of one runner and steering device. Fig. 6 is a perspective view of one of the auxiliary steering runners detached. Fig. 7 is a horizontal sectional view illustrating the steering means, the auxiliary steering runners being shown in dotted lines as operatively positioned. Fig. 8 is an enlarged vertical sectional view through a portion of the device illustrating two propelling gears and their operative connections. Fig. 9 is a vertical sectional detail view illustrating the steering device. Fig. 10 is a top plan view thereof. Fig. 11 is a sectional detail view through a gear member and its operating pitman. Fig. 12 is a rear view of a manually operated ratchet driving means, and Fig. 13 is a sectional view thereof.

The present driving mechanism may be readily applied to different forms of sleds which are adapted to slide over the snow and ice during the operation thereof, the invention being herein shown in connection with a conventional form of sled 10 having forwardly curved opposite runners 11 and a horizontal top or deck 12, metallic shoes 13 formed of strips of metal being carried by the runners 11 in the usual manner.

A plurality of propellers 14 in the form of pushing legs and having sharpened ground engaging calks 15 at their free ends are carried beneath the sled top 12 having their upper ends pivoted as at 16 to the lower ends of propelling arms 17, the latter having driving heads 18 freely journaled upon a stationary shaft 19 carried transversely of the sled and beneath the top thereof by means of opposite brackets 20 secured to opposite upright braces 21 of the sled. Propelling heads 22 are journaled upon a transverse shaft 23 carried forwardly of a forward brace 24 of the sled, the upper and lower ends of the heads 18 and 22 being operatively connected together by links 25 and 26 respectively pivotally connected to the said heads, it being understood that a forward head 22 is provided for each of the driving heads 18.

A gear housing or frame 27 is arranged upon the sled top 12 substantially above the forward braces 24 and is provided with a transmission shaft 28 arranged transversely of the sled and provided with a driving gear 29 for each of the propellers 14, a transmission gear 30 is carried by the shaft 28 being operatively connected by the pinion 31 with the driving shaft 32 of a motor 33 arranged upon the sled top 12 forwardly of the gear housing 27, the operative connection between the motor 33 and its shaft 32 being controlled by a suitable form of clutch 34.

A journaling stringer 35 is provided above each of the gears 29 and spanning the top of the gear case 27, a pair of simultaneously operating gears 36 being journaled at opposite sides of each stringer 35 and in constant mesh with the adjacent driving gear 29. An H-shaped form of pitman 37 is provided for each forward head 22 being pivotally connected spanning the same by a pin 38, the upper end of each pitman 37 spanning the adjacent pair of gears 36 and having its separate arms 39 pivoted to a separate one of the gears 36 as best illustrated in Fig. 11 of the drawings. It will thus be apparent that upon operating the motor 33, the shaft 32 is turned under the control of the clutch 34, thus propelling the transmission shaft 28 and through the driving gears 29 and the gears 36 imparting reciprocating movement to the pitman 37 for rocking the heads 22. The movement of the forward heads 22 is communicated to the driving heads 18 by means of links 25 and 26, thus causing the driving heads 18 to rock upon the shaft 19. This movement of the heads 18 imparts swinging movements to the arms 17 and alternate rearward and forward kicking movements to the propellers 14, while leaf springs 40 are connected between the propellers 14 and a transverse rear rod 41 of the sled for forcing the calks 15 into the roadway 42 at the beginning of the rear impulse imparted to the propellers 14. Helical springs 43 are connected between the propellers 14 and their respective arms 17 for returning the propellers 14 to their elevated positions after each operative movement thereof. In practice therefore, the motor 33 will readily operate the propellers 14 by means of their respective arms 17 in alternate rearward pushing movements, the propellers 14 moving rearwardly with respect to the sled and then returning upwardly to their normal elevated positions, their path of movement being controlled by the aforementioned connecting springs 40 and 43. It will be understood that the pitmen 37 are connected up at different angles with respect to the transmission shaft 28 in their attachment to the respective power gear 36 which will influence the propellers 14 at different times or successively rather than in unison and thereby affording more continuity in the propulsion of the sled.

A rocking beam 44 is provided rearwardly of the braces 21 and has an arm 45 for each of the propellers 14, the arm 45 being connected to each of the propellers by means of a flexible elevating means or cord 46. An operating lever 47 is mounted upon a rack 48 above the sled top 12 and is connected by a rod 49 with an arm 50 of the said shaft 44 and whereby as will be evident, a rearward movement of the lever 47 will elevate all of the propellers 14 simultaneously and in which position the same may be maintained by means of the dog 51 carried by the lever 47 as best illustrated in Fig. 3 of the drawings.

A manual propelling means is provided for the transmission shaft 28 consisting of a foot pedal 52 hinged to a bracket 53 upon the sled top 12 and connected by a link 54 with a swinging arm 55 journaled upon the said shaft 28 and having operative connections with the teeth of the transmission gear 30 by means of a spring pressed pawl 56. It will thus be understood that by successive operations of the foot pedal 52 the gear 30 may be turned for operating the propellers 14, it being noted that a spring 57 automatically returns the pedal 52 to its elevated position.

A steering means is provided for the sled consisting of auxiliary runners 58 formed of interrupted portions of the shoes 13 at the forward curved portions thereof, each of the said auxiliary runners 58 having a turn post 59 mounted on the rear end thereof and journaled through the carrying runner 11 and also through longitudinal braces 60 carried by the said runners. Arms 61 are secured to the upper ends of the post 59 and a connecting bar 62 pivotally connects the free ends of the said arms. A toothed segment 63 is carried by a connecting bar 64 having at its one end a sliding engagement through a transverse slot 65 of the bar 62 and with its opposite or rear end pivoted to a cross member 66 connecting the sled braces 24. A usual form of steering post 67 extends through the sled top 12 and has a pinion 68 at its lower end in constant mesh with the rack 63 and whereby it will be evident by turning the steering wheel 69 attached to the said post 67, the auxiliary runners 58 may be shifted laterally as best illustrated by dotted lines in Fig. 7 of the drawing for steering the sled sidewise and in each direction desired.

An advantageous form of mechanically operated sled is thus arranged which may be driven either by motor or foot power for forwardly propelling the sled under the control of the steering mechanism provided therefor.

While the form of the invention herein shown and described is what is believed to be the preferable embodiment thereof, it is nevertheless to be understood that minor changes may be made in the form, proportion and details of construction without departing from the spirit and scope of the invention as hereinafter claimed.

What I claim as new is:—

1. Sled propelling means comprising in combination with a sled having a top and runners, a rear driving head and a forward head shiftably mounted beneath the said top, links pivotally connecting the upper and lower ends of the said heads, an arm rigidly carried depending from the said driving head, a propelling leg pivotally suspending from the free end of the said arm, a ground engaging calk upon the free end of the said leg, a depressing direction-imparting spring attached to the said leg, a return spring for the said leg attached between the said leg and arm and oscillation-imparting means operatively connected to the said forward head.

2. Sled propelling means comprising in combination with a sled having a top and runners, a rear driving head and a forward head shiftably mounted beneath the said top, links pivotally connecting the upper and lower ends of the said heads, an arm rigidly carried depending from the said driving head, a propelling leg pivotally suspending from the free end of the said arm, a ground engaging calk upon the free end of the said leg, a depressing direction-imparting spring attached to the said leg, a return spring for the said leg attached between the said leg and arm, a gear frame mounted upon the said top above the said forward head, a stringer transversely carried by the said frame, a pair of companion gears journaled upon opposite sides of the said stringer, a pitman separately pivoted to the said gears and having its lower end operatively attached to the said forward head, a transmission shaft journaled in the said frame, a driving gear upon the said shaft, in constant mesh with the said companion gears, a transmission gear upon the said shaft, and driving means for the said transmission gear.

3. Sled propelling means comprising in combination with a sled having a top and runners, a rear driving head and a forward head shiftably mounted beneath the said top, links pivotally connecting the upper and lower ends of the said heads, an arm rigidly carried depending from the said driving head, a propelling leg pivotally suspending from the free end of the said arm, a ground engaging calk upon the free end of the said leg, a depressing direction-imparting spring attached to the said leg, a return spring for the said leg attached between the said leg and arm, a gear frame mounted upon the said top above the said forward head, a stringer transversely carried by the said frame, a pair of companion gears journaled upon opposite sides of the said stringer, a pitman separately pivoted to the said gears and having its lower end operatively attached to the said forward head, a transmission shaft journaled in the said frame, a driving gear upon the said shaft, in constant mesh with the said companion gears, a transmission gear upon the said shaft, lever operated elevating means for the said leg, and a motor carried by the said top operatively connected to the said transmission gear.

4. A device of the class described comprising a sled having runners and a top, a gear frame upon the said top, stringers arranged transversely of the said frame, a transmission shaft journaled in the said frame, driving gears carried by the said shaft, propelling means for the said shaft, a pair of gears journaled at opposite sides of each of said stringers and provided for each of said driving gears in constant mesh therewith, oscillating forward heads positioned beneath said top, H-shaped pitmen connecting said heads and said pairs of gears, the said pitmen being arranged in staggered relations, driving heads, pivotal link connections between the top and bottom of the said driving and forward heads and spring controlled ground engaging propellers operatively attached to the said driving heads.

In testimony whereof I affix my signature.

NYKOLA KOLOMYJCZUK.

Copies of this patent may be obtained for five cents each, by addressing the "Commissioner of Patents, Washington, D. C."